(12) United States Patent
Pabon et al.

(10) Patent No.: US 11,698,955 B1
(45) Date of Patent: Jul. 11, 2023

(54) INPUT-TRIGGERED INMATE VERIFICATION

(71) Applicant: CONFINEMENT TELEPHONY TECHNOLOGY, LLC, Greensboro, NC (US)

(72) Inventors: Timothy Edwin Pabon, Greensboro, NC (US); John Vincent Townsend, III, Kernersville, NC (US); Robert James Deglman, Lakewood Ranch, FL (US); Rick Allen Lubbehusen, Winston Salem, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 0 days.

(21) Appl. No.: 17/550,257

(22) Filed: Dec. 14, 2021

Related U.S. Application Data

(62) Division of application No. 17/126,383, filed on Dec. 18, 2020, now Pat. No. 11,232,185.

(Continued)

(51) Int. Cl.
*G06N 20/00* (2019.01)
*G06F 21/32* (2013.01)
(Continued)

(52) U.S. Cl.
CPC .......... *G06F 21/32* (2013.01); *G06K 7/1413* (2013.01); *G06N 20/00* (2019.01); *G09B 7/00* (2013.01);
(Continued)

(58) Field of Classification Search
CPC ...... G06F 21/32; G06N 20/00; G06K 7/1413; G06K 9/0004; G06K 9/00912; G06K 9/00926; G09B 7/00
See application file for complete search history.

(56) References Cited

U.S. PATENT DOCUMENTS 7,111,321 B1 * 9/2006 Watts, Jr. ................ G06F 21/34
709/224
2014/0337930 A1 11/2014 Hoyos
(Continued)

OTHER PUBLICATIONS

Herzberg et al, "My Authentication Album: Adaptive Images-Based Login Mechanism", 2012, SEC 2012, IFIP AICT 376, pp. 315-326 (12 pages) (Year: 2012).*

Dhamija et al, "Déjà Vu: A User Study Using Images for Authentication", 2000, Proceedings of the 9th USENIX Security Symposium (15 pages). (Year: 2000).*

*Primary Examiner* — David F Dunphy
(74) *Attorney, Agent, or Firm* — Thompson Hine LLP

(57) ABSTRACT

Some implementations provide input-triggered user verification. This may involve trigging a user verification (e.g., capture of an image, sound, fingerprint, etc.) to verify a user's identity based on input (e.g., typing) received ad the device. Triggering the user-verification based on receiving input may help ensure that the image, sound, fingerprint, etc. is captured at a time when the user is close to the device, touching the finger-print sensor, and/or in view of the camera during the capturing. Some implementations provide user verification based on a user-identification of a previously selected image. This may involve using an inmate-selected picture or other image to recover a forgotten alphanumeric reference. Some implementations of the invention disclosed herein provide user verification based on a computer-vision identification of a wearable identification tag. This may involve using an image of the user's identification tag worn on the user's wrist to verify the user's identity.

6 Claims, 8 Drawing Sheets

Related U.S. Application Data

(60) Provisional application No. 62/951,316, filed on Dec. 20, 2019.

(51) Int. Cl.
| | | |
|---|---|---|
| *G06K 7/14* | (2006.01) | |
| *G09B 7/00* | (2006.01) | |
| G06V 40/50 | (2022.01) | |
| G06V 40/60 | (2022.01) | |
| G06V 40/13 | (2022.01) | |

(52) U.S. Cl.
CPC .......... *G06V 40/1318* (2022.01); *G06V 40/50* (2022.01); *G06V 40/67* (2022.01)

(56) References Cited

U.S. PATENT DOCUMENTS

| | | |
|---|---|---|
| 2015/0037781 A1 | 2/2015 | Breed |
| 2016/0065558 A1 | 3/2016 | Suresh |
| 2016/0293025 A1 | 10/2016 | Marr |
| 2017/0161478 A1 | 6/2017 | Stavrou |
| 2017/0185760 A1 | 6/2017 | Wilder |
| 2018/0205725 A1* | 7/2018 | Cronkright ......... H04L 63/0838 |
| 2019/0130083 A1 | 5/2019 | Agassy |
| 2020/0302041 A1 | 9/2020 | Mohammad |

* cited by examiner

INPUT-TRIGGERED INMATE VERIFICATION

RELATED APPLICATIONS

This patent application is a divisional of U.S. patent application Ser. No. 17/126,383 filed on Dec. 18, 2020, which claims the benefit of U.S. Provisional Application No. 62/951,316 filed on Dec. 20, 2019, entitled "INPUT-TRIGGERED INMATE VERIFICATION," each of which is incorporated herein by this reference in its entirety.

FIELD OF THE INVENTION

This disclosure relates generally to devices and systems that control the access to and use of electronic devices, applications, network services, and accounts based on verifying the identities of confinement institution inmates and other users.

BACKGROUND

Prison, jails, and other confinement institutions provide a variety of educational and technological services to their residents and staff. In these and other contexts, it may be desirable to control user access to and use of phones, tablets, and other electronic devices and the applications, network services, and accounts that are made available using such devices. Controlling access and use may be based on verifying an inmate's identity. Such verification may enable monitoring for improper use, damage, theft, and other issues. In addition, educational courses and services provided on inmate devices and systems require accurate inmate identification and user monitoring to accurately track and give credit for inmate education activities. Accurate and efficient inmate verification is needed for these and other objectives.

SUMMARY

Some implementations of the invention disclosed herein provide input-triggered user verification. This may involve trigging a user verification (e.g., capture of an image, sound, fingerprint, etc.) to verify a user's identity based on input (e.g., typing) received at the device. Triggering the user-verification based on receiving input may help ensure that the image, sound, fingerprint, etc. is captured at a time when the user is close to the device, touching the finger-print sensor, and/or in view of the camera during the capturing.

Some implementations of the invention disclosed herein provide user verification based on a user-identification of a previously selected image. This may involve using an inmate-selected picture or other image to recover a forgotten alphanumeric reference (e.g., PIN, password, or code). PINs, text, letters, words, and other alphanumeric references may be difficult to remember for some inmates and it may be infeasible, inconvenient, and unsecure for the inmates to create a written record of such items. In contrast, it may be relatively easier for some inmates to remember an image sufficiently to be able to pick the image out of a collection of images than to remember an alphanumeric reference (e.g., PIN, password, or code). Such image selection may be used as part of an inmate verification process, e.g., to enable the inmates to recover lost PINs and other alphanumeric references.

Some implementations of the invention disclosed herein provide user verification based on a computer-vision identification of a wearable identification tag. This may involve using an image of the user's identification tag worn on the user's wrist to verify the user's identity. The tags may be locked onto the users' wrists such that removal of the tags requires special equipment, keys, etc. The process may interpret an image to confirm that a tag is being worn by a user and that it displays a code (e.g., a particular alphanumeric code, barcode, etc.). This may prevent a second user from simple typing the code that printed a first user's tag to impersonate the first user's identity since that second user will not have access to the physical device attached to the first user's wrist.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE FIGURES

These and other features, implementations, and advantages of the present disclosure are better understood when the following Detailed Description is read with reference to the accompanying drawings.

DETAILED DESCRIPTION

Figure 1:
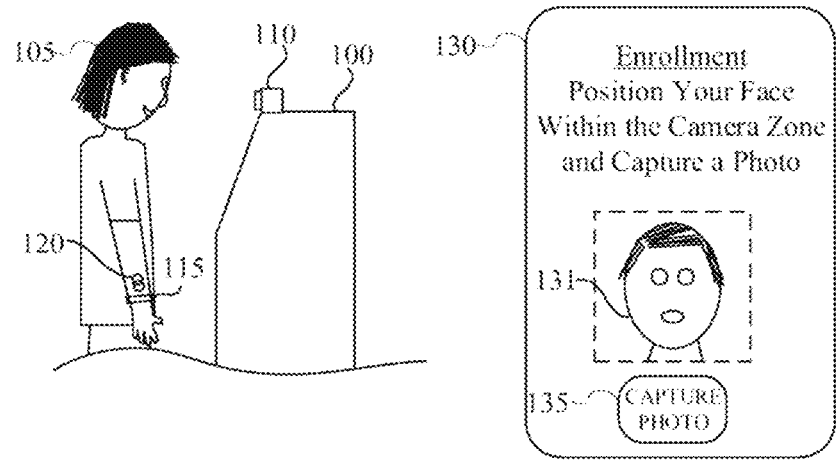
FIG. 1 illustrates enrollment in a user verification process according to some implementations disclosed herein.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Implementations disclosed herein facilitate accurate inmate identification and user monitoring. One exemplary implementation involves a method that grants a first user access to a device or service provided via the device. Access is granted based on verifying the identity of the first user accessing the device or service. For example, the first user may be identified based on an image of the first user, an audio sample of the first user, biometric information provided by the first user, and/or identification or password information provided by the first user during a log-in or access phase. User verification may be based upon comparison of new information (e.g., user input, images, audio capture, finger-print capture, etc.) to previously obtained enrollment information.

FIG. 1 illustrates enrollment in a user verification process according to some implementations disclosed herein. In this example, user 105 uses device 100 to enroll in a user verification system. In this example, the device 100 is a fixed and/or relatively large (i.e., not hand-held) device such as a kiosk computing device that may be mounted to a wall, floor, or other structure in a confinement facility. The device 100 includes a camera 110 that captures one or more images of the user 105, other sensors, and/or input devices to receive information used during the enrollment process.

The device 100 present a user interface 130 to guide the user 105 through the enrollment process. The user interface 130, in this example, instructs the user 105 with a message: "Position Your Face Within the Camera Zone and Capture a Photo," and provides a view 131 of a live camera feed from camera 110. The user interface 130 also provides a user interface control 135 (e.g., button, icon, etc.), that the user selects after positioning his or her face within the view 131. The user interface 130 may provide additional or alternative instructions to ensure that the user 105 is positioned relative to the camera 110 to capture an image having requisite qualities, e.g., ensuring the user 105 is positioned within a desired distance range, the image of the user 105 has an appropriate size (e.g., head dimensions), etc. The device 100 may evaluate the images captured and, if requisite image characteristics are not satisfied, provide instructions for the user to provide additional images.

The user interface 130 may additionally or alternatively receive additional input and/or sensor data from the user during the enrollment process including, but not limited to, text input with user information, spoken audio samples, biometric sensor data such as finger print data, retina scans, and/or other unique user attributes. In some implementations, the user responds to queries for personal information with audible responses that are both interpreted to identify substantive responses and recorded to provide audio samples of the user's voice.

Enrollment may be performed at or soon after the time at which an inmate arrives at a confinement facility. Enrollment may additionally or alternatively be performed at any other time during an inmate's time within a confinement facility, for example, in the case of a re-enrollment being performed based on a change to an inmate's status, appearance, circumstances, or a change to the user verification processes.

Figure 2:
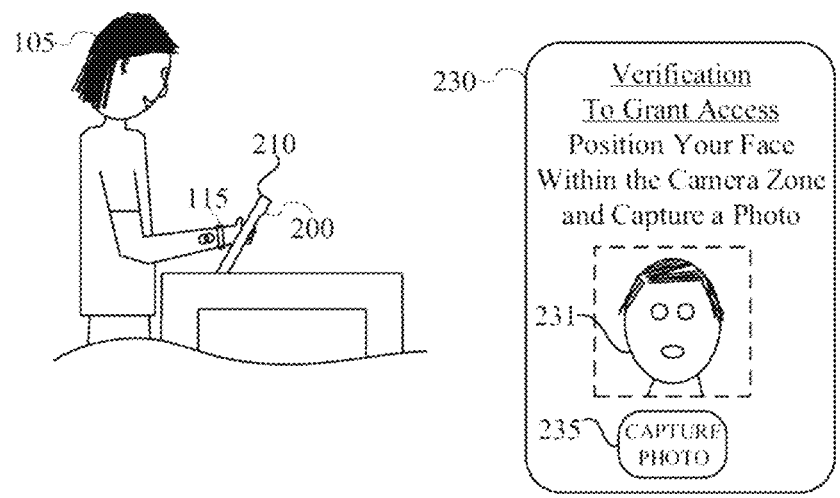
FIG. 2 illustrates enrollment in a user verification process according to some implementation disclosed herein.

FIG. 2 illustrates an additional or alternative enrollment in a user verification process according to some implementations disclosed herein. In this example, user 105 uses device 200 to enroll in a user verification system. In this example, the device 200 is a portable (i.e., hand-held) device such as a tablet computing device. The device 200 includes a camera 210 that captures one or more images of the user 105, other sensors, and/or input devices to receive information used during enrollment.

Similar to device 100 illustrated in FIG. 1, the device 200 of FIG. 2 presents a user interface 230 to guide the user 105 through the enrollment process. The user interface 230, in this example, instructs the user 105 with a message: "Position Your Face Within the Camera Zone and Capture a Photo," and provides a view 231 of a live camera feed from camera 210. The user interface 130 also provides a user interface control 235 (e.g., button, icon, etc.), that the user selects after positioning his or her face within the view 231. The user interface 230 may provide additional or alternative instructions to ensure that the user 105 is positioned relative to the camera 210 to capture an image having requisite qualities, e.g., ensuring the user 105 is positioned within a desired distance range, the image of the user 105 has an appropriate size (e.g., head dimensions), etc. The device 200 may evaluate the images captured and, if requisite image characteristics are not satisfied, provide instructions for the user to provide additional images.

Following enrollment, the enrollment information provided by the user 105 is used to validate the identity of the user when he or she accesses and uses devices, systems, services, and/or accounts provided within the confinement facility.

Figure 3:
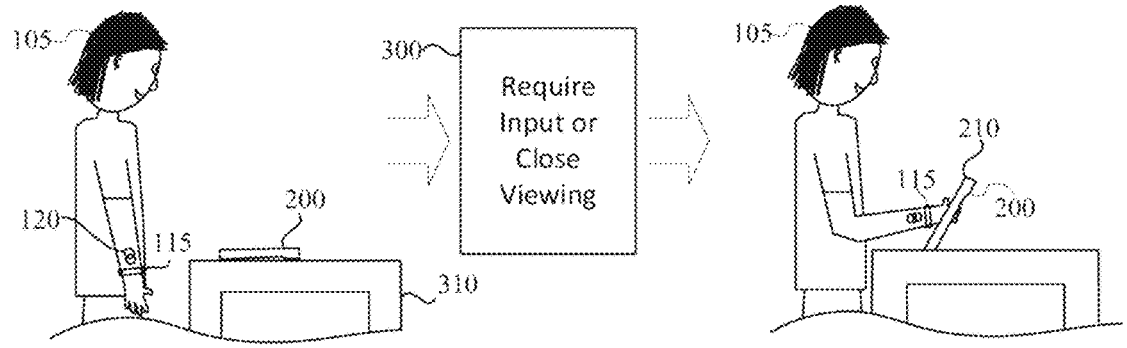
FIG. 3 illustrates an aspect of a user verification process according to some implementations disclosed herein.

Some implementations disclosed herein provide input-triggered user verification. FIG. 3 illustrates an exemplary input-triggered user verification process. In this example, the user 105 uses device 200 while an inmate of a confinement institution. In this example, the user 105 views a course or other content while the device 200 is resting flat on a table 310. In this position, the camera 210 on the device 200 would capture images depicting little or none of the user 105. However, the device 200 is configured to require input or close viewing, as illustrated in block 300. For example, the device 200 may present relatively small text to be read or require a selection on a touch screen of device 200. To read the relatively small text or make the selection, the user 105 may lift or tilt the device 200 so that the camera 210 has a relatively better view of at least a portion of the user 105. One or more images (or other sensor data) of the user 105 may be captured while the user 105 is lifting, tilting, or providing the required input to the device 200, and this captured data may be used to verify the identity of the inmate. Accordingly, the user verification (e.g., capture of an image, sound, fingerprint, etc.) at a time requiring input and/or close viewing may be used to verify the user 105 identity. Triggering the user-verification at such a time may ensure that the image, sound, fingerprint, etc. is captured at a time when the user is close to the device, touching the finger-print sensor, and/or in view of the camera during the capturing.

Figure 4:
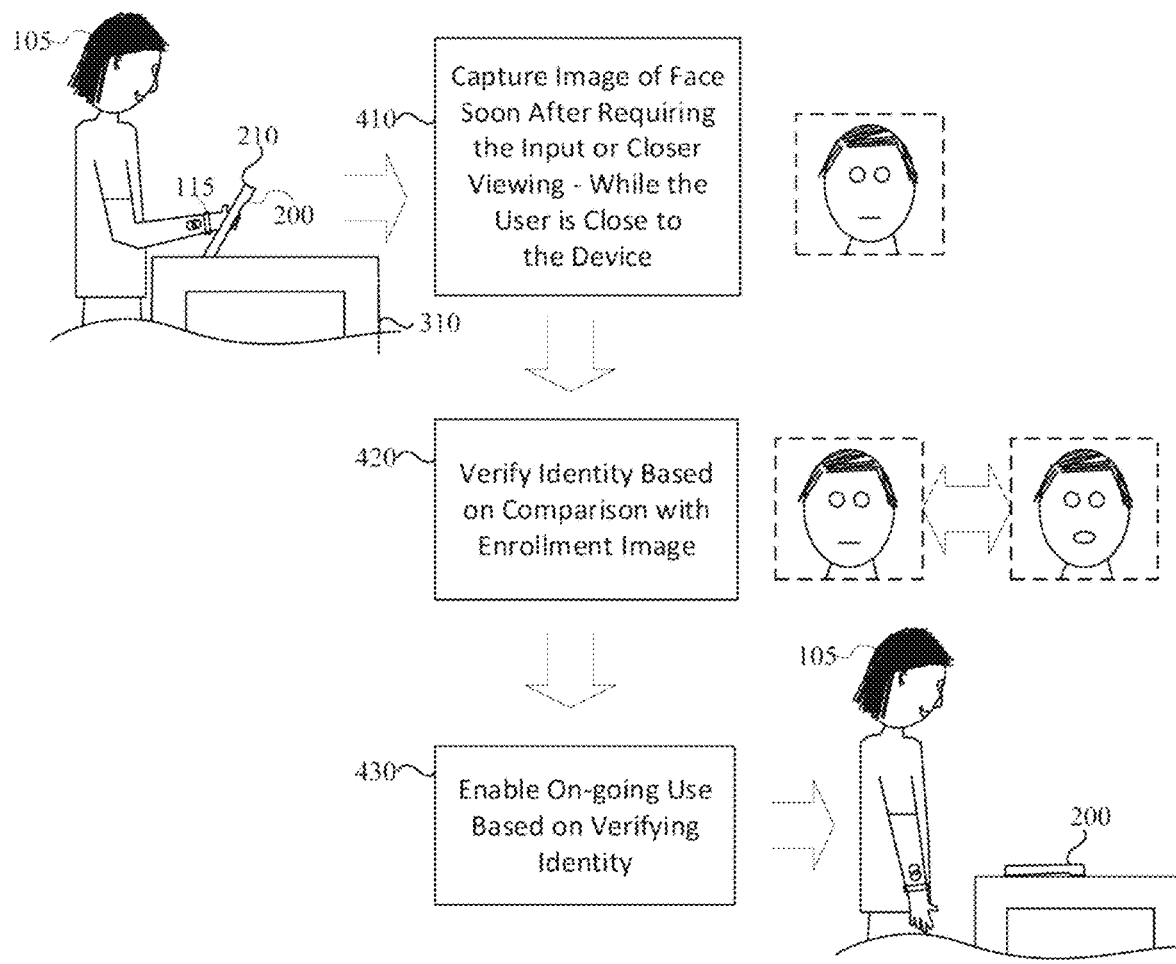
FIG. 4 illustrates an exemplary user verification process according to some implementations disclosed herein.

FIG. 4 illustrates an exemplary user verification process. User 105 has lifted and/or tilted device 200 to respond to a something requiring input and/or closer viewing. At block 410, an image of the face of the user 105 is captured soon after receiving the input or the user moving for closer viewing, e.g., while the user is relatively close to the device and in view of the camera 210. At block 420, the identity of the user 105 is verified based on a comparison with the enrollment image. At block 430, on-going use of the device 200 and/or service is enabled based on the verifying the identity of the user 105. The user 105 may then continue using the device 200 or service. Should the verification fail (e.g., based on not detecting the appropriate user 105 in the image(s)), on-going use of the device 200 may be discontinued or suspended and/or an appropriate message or instruction may be provided to the current user requiring further action or verification steps.

Figure 5:
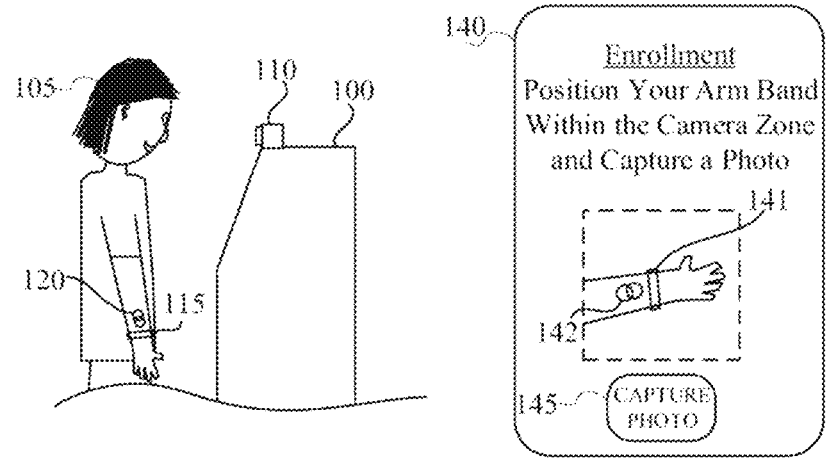
FIG. 5 illustrates enrollment in a user verification process according to some implementations disclosed herein.

FIG. 5 illustrates another example of enrollment in a user verification process. In this example, the device 100 present a user interface 140 to guide the user 105 through the enrollment process. The user interface 140, in this example, instructs the user 105 with a message: "Position Your Arm Band Within the Camera Zone and Capture a Photo," and provides a view 141 of a live camera feed from camera 110. The user interface 140 also provides a user interface control 145 (e.g., button, icon, etc.), that the user selects after positioning his or her face within the view 131. The user interface 130 may provide additional or alternative instructions to ensure that the arm and/or arm band 115 of the user 105 are positioned relative to the camera 110 to capture an image have requisite qualities. The device 100 may evaluate the images captured and, if requisite image characteristics are not satisfied, provide instructions for the user to provide additional images. The user 105 positions his or her arm such that the arm band 115 will be captured in the image. As a result, the view of the camera 110 includes a depiction 141 of the arm band. In this example, the view of the camera 110 also includes a depiction 142 of a unique arm characteristic 120 of the user (e.g., a tattoo).

The user interface 140 may additionally or alternatively receive additional input and/or sensor data from the user during the enrollment process including, but not limited to, text input with user information, spoken audio samples that may or may not provide user information, biometric sensor data such as finger print data, retina scans, and/or other unique user attributes.

Enrollment may be performed at or soon after the time at which an inmate arrives at a confinement facility. Enrollment may additionally or alternatively be performed during any other time during an inmate's time within a confinement facility, for example, in the case of a re-enrollment being performed based on a change to an inmate's status, appearance, circumstances, or a change to the user verification processes.

Figure 6:
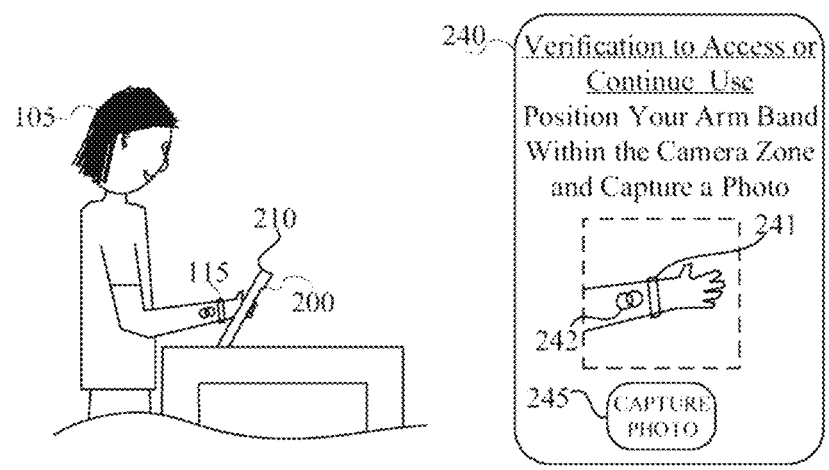
FIG. 6 illustrates an aspect of a user verification process according to some implementations disclosed herein.

FIG. 6 illustrates an exemplary user verification process following the enrollment illustrated in FIG. 5. In this example, a different device 200 is used by the user 105 than was used for user enrollment. In other implementations, the same device will be used for enrollment and later use/verification by the user 105. In this example, during use of the device 200, the device 200 determines to require user verification for allowing (or denying) initial or continuing use of the device 200. Device 200 presents user interface 240 with an instruction "Position Your Arm Band Within the Camera Zone and Capture a Photo," a live view from camera 210, and a capture photo 245 user interface option. The user 105 follows the instructions and the user's identity is confirmed by device 200 determining that the arm band (e.g., its inmate ID) in a current photo is the same as the arm band corresponding the enrolled user in a photo of the user captured during enrollment. In some implementations, additional features are used to confirm the identity of the user. For example, a depiction of a unique arm characteristic 242 (e.g., a tattoo) may be compared with the appearance of the user's arm during enrollment, e.g., to identify a match with the depiction 142 of a unique arm characteristic 120 of the user (e.g., a tattoo).

Figure 7:
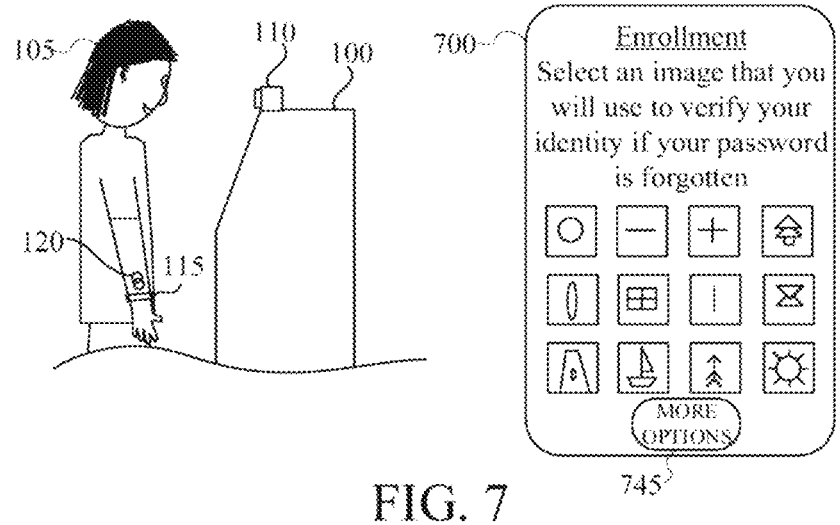
FIG. 7 illustrates enrollment in a user verification process according to some implementations disclosed herein.

FIG. 7 illustrates another example of enrollment in a user verification process. In this example, the device 100 present a user interface 700 to guide the user 105 through the enrollment process. The user selects an image to use for user verification. In this example, the user interface 700 presents a set of images and instruction "Select an image that you will use to verify your identity if your password is forgotten." The user interface 700 also provides a user interface control 745 (e.g., button, icon, etc.), that the user selects to view addition image options. The user 105 selects one (or more in some implementations) of the images to use during user verification, e.g., in the circumstance of a forgotten password.

Figure 8:
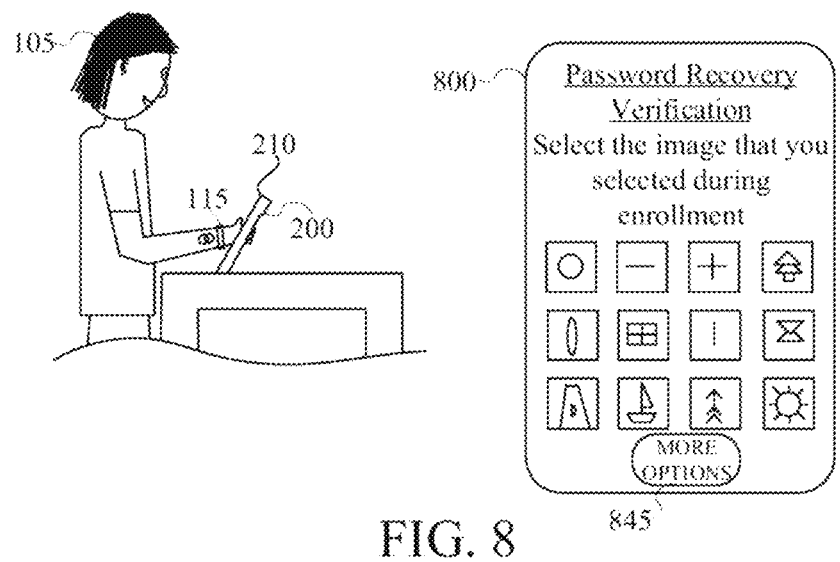
FIG. 8 illustrates an aspect of a user verification process according to some implementations disclosed herein.

FIG. 8 illustrates an exemplary user verification process following the enrollment illustrated in FIG. 7. In this example, a different device 200 is used by the user than was used for user enrollment. In other implementations, the same device will be used for enrollment and later use/verification by the user 105. In this example, during use of the device 200, the device 200 determines to require user verification for initial or continuing use of the device 200 and the user cannot remember his or her password. Accordingly, the user 105 indicates to the device 200 that password recovery is needed. The device 200 presents user interface 800 with an instruction "Select an image that you selected during enrollment." The user 105 follows the instructions and selects the same photo that the user 105 selected during enrollment. In this example, the user interface 800 also provides a user interface control 845 (e.g., button, icon, etc.), that the user selects to view addition image options. It may be desirable to provide a relatively large set of image in multiple sub-sets to reduce the possibility of an imposter guessing the inmate's password recovery image.

Based on the user 105 selecting the same image, device 200 enables initial or continuing access to the device 200 and/or services and/or enables the user 105 to recover the user's password, e.g., by informing the user 105 of the current password or enabling the user to set a new password.

Input-Triggered User Verification

Some implementations provide input-triggered user verification. This may involve trigging a user verification (e.g., capture of an image, sound, fingerprint, etc.) to verify a user's identity based on input (e.g., typing) received at the device. Triggering the user-verification based on receiving input may help ensure that the image, sound, fingerprint, etc. is captured at a time when the user is close to the device, touching the finger-print sensor, and/or in view of the camera during the capturing.

In some implementations, input is received at the device during on-going use of the device or service. The on-going use may include an educational course, a content surfing session, an e-mail session, and/or an account access. The input may be triggered by a question requiring a response, for example, during an educational course. A user may be prompted to say or type a particular phrase or to touch a particular portion of a touch screen or other input device capable of obtaining biometric information. The user interface may be configured to encourage a particular position of the user while the input is received. For example, the text of a question may be relatively small to encourage users to be close to their screens and thus cameras when input is entered.

A user verification may be triggered on the device based on receiving the input. For example, the user verification may capture an image via a camera and/or a sound via a microphone during or soon after the user provides the input. The user verification may be based on an image, sound, and/or biometric data captured at the device. In some implementations, a camera is positioned, and its images are analyzed, to obtain an image or image portion that is likely to include a depiction of whomever is currently providing the input. The user verification may use light intensity images (e.g. RGB images) and/or depth data from a traditional camera and/or depth camera (e.g., time of flight, etc.). The user verification may be based on a 2D representation of the user or a 3D representation of the user. In another example, microphones are positioned on the device, and audio captures are analyzed to identify sound likely to have come from whomever is currently providing the input. In another example, the user verification additionally or alternatively involves obtaining and analyzing biometric data such as a fingerprint provided by whomever provided the input.

Whether the first user (e.g., the correct inmate) is using the device during the on-going use of the device is determined based on the user verification. In the example of an education course, a user may be given credit for a course based on determining that the user was, in fact, the user who completed the course, e.g., the identity of the first user was verified during/throughout the on-going course activity via one or more input-triggered user verifications. In another example, input-triggered user verifications are used to determine which of multiple users was most recently using the device prior to damage occurring to the device.

In another example, input-triggered user verifications are used to identify when a device has been stolen or otherwise obtained by an inmate who should not have access to the device and/or services provided on the device, and appropriate corrective actions may be automatically initiated. If the user verification does not verify the presence, participation, etc. of the first user in the ongoing use of the device, various actions may be initiated. For example, a suspicious activity flag may be set. In another example, an alert, message, or call to an appropriate authority may be initiated. In another example, some or all of the content of the device or services available through the device may be disabled, hidden, or otherwise controlled until the identity/presence/participation of the first user is again verified. In some implementations, a real-time alert it provided when suspicious activity is detected. In some implementations, the unauthorized user input may be used to lookup the identity of the unauthorized user and implement restrictions on the unauthorized user's use of the device.

In some implementations, techniques disclosed herein are used to verify that a particular inmate (e.g., inmate number 4786) viewed/virtually attended/participated in an educational course and thus that somebody else did not view/attend/participate in the course for him or her. In some implementations, a method is used to validate and prove the identity of a user at one or more points in time during on-going participation in an educational course. A picture may be captured of the user during each of multiple user inputs/responses throughout this course and used to validate the identity of the user throughout the course. In some implementations, inputs are responses to substantive queries about the course materials.

In some implementations, user verification involves facial recognition against a stored facial profile of a user. In some implementations, user verification during an on-going experience involves comparing a current image (or model derived therefrom) against a prior image (or model derived therefrom) to determine that the user viewing or taking the course did not change. In some implementations, a machine learning model is used to perform the user verification.

Some implementations compile education course completion information based on user verification before, during, and after an electronic course. Such user verifications can include recorded information including inmate quiz responses, images of the inmate during and throughout a course, images of the inmate while providing responses, etc. In one implementation, a test verification output includes a sequence of multiple images captured during a test (e.g., during a 20 question course participant evaluation). The images may depict the environment around the device used to complete the test. The images may be compiled (e.g., tiled or in a scrollable list) on a single interface or document that enables a viewer/reviewer to (a) visually confirm that an inmate was participating throughout a course, (b) visually confirm that another individual was not interfering, helping, or replacing the inmate, and (c) visually assess the interest and participation of the inmate, e.g., by seeing the inmate's eyes open, gazing towards the course content, etc.

Similarly, audio recordings can be captured during the test using a microphone in the environment around the device used to complete the test. The audio may allow a viewer/reviewer to confirm hear samples of the user's voice during the test. In addition, such audio samples may allow the reviewer to confirm that other people were not talking to provide answers or otherwise inappropriately participating in or influencing the test.

In some implementations, course completion information is generated that provides proof for a public defender, job placement service, or other inmate advocate. Such proof may help establish that an inmate is, in fact, demonstrating ability and effort, completing courses, passing tests, and otherwise behaving in a desirable way. Such proof may be more persuasive to a judge or district attorney who may have discretion with respect to taking actions for or against the inmate that may be swayed based on the inmate's abilities, behavior, and educational effort. Course completion information may include a transcript of all the classes that the inmate took including, but not limited to, time/date stamps associated with viewing the course content and assessments, length of time to complete courses, images of the inmate and the inmate's environment during the course, audio recordings of the inmate and the inmate's environment during the course, video recordings of the inmate and the inmate's environment during the course, biometric information, facial recognition verifications, voice verifications or other confirmations for every class that that an inmate took, and the like. A strict, accurate, and reliable education track record may help distinguish inmates with abilities and who are demonstrating effort from inmates who lack those abilities and fail to demonstrate effort or attempt to circumvent and cheat the system.

In some implementations, an inmate account set up/enrollment process is provided. In one example, when an inmate logs into a device (e.g., a tablet) for the first time, he or she will be asked to set up an account. The inmate will enter his or her inmate ID#, PIN Number, and date of birth (DOB). The inmate may be asked security questions. These security questions may be used for later identity verification, including but not limited to, verifications that occur during use of the same or different electronic devices and/or during educational courses and testing.

Figure 9:
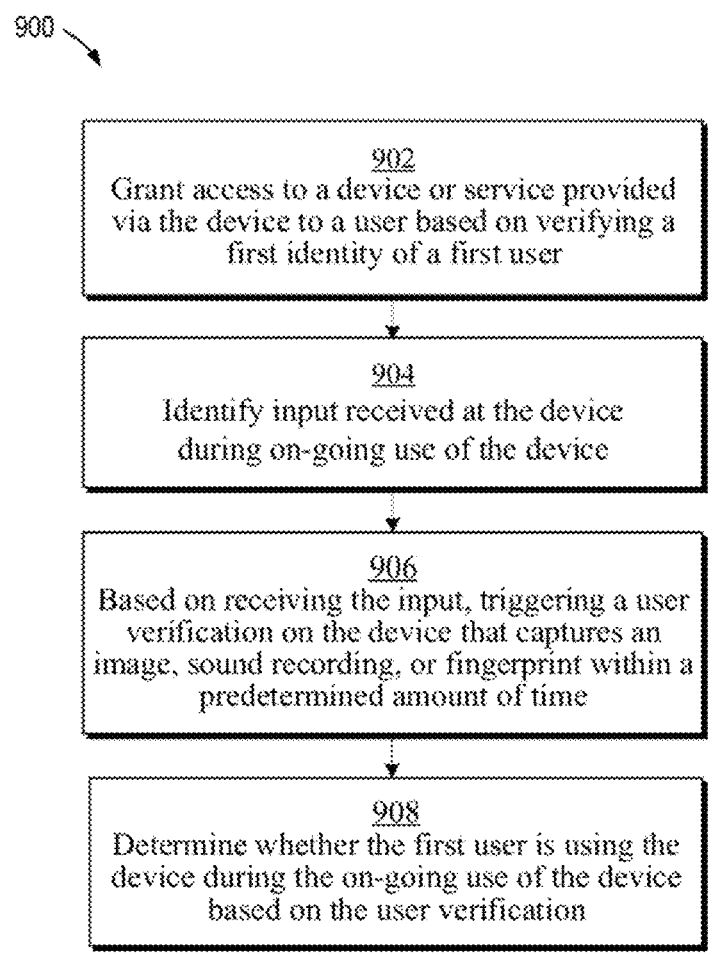
FIG. 9 is a flow chart illustrating an exemplary method for input-triggered user verification.

FIG. 9 is a flow chart illustrating an exemplary method 900 for input-triggered user verification. The exemplary method 900 can be implemented via a computing device, for example, by storing and using a processor to execute instructions in a non-transitory computer-readable medium. Reference to the method being performed by a computing device includes the method being performed by one or more computing devices and/or using one or more processors.

The method 900 involves granting access to a device or service provided via the device to a user based on verifying a first identity of a first user as shown in block 902. For example, the user's identity may be initially verified when a user powers on the device or initiates a particular application or service on the device, e.g., based on the user providing an identification number and password at startup.

The method 900 involves identifying input received at the device during on-going use of the device as shown in block 904. For example, the on-going use may be an educational course, a content surfing session, an e-mail session, an account access. The input may be triggered by a question requiring a response, for example, during a course. A question may prompt the first user to say or type a particular phrase or to touch a particular portion of a touch screen or other input device capable of obtaining biometric information. The question may be presented at a reduced volume or font size relative to other content such that the first user positions his or her head closer to the device to see and/or understand the question and/or provide input.

The method 900 further involves triggering a user verification on the device based on receiving the input as shown in block 906. For example, this may involve capturing of an image via a camera and/or a sound via a microphone during or soon after the user provides the input. The user verification may involve capturing the image, sound recording, or fingerprint immediately upon receiving the input. The user verification may involve capturing an image, sound recording, or fingerprint within a predetermined amount of time of receiving the input.

A camera may be positioned on the device to obtain an image of whomever is currently providing the input. The user verification may involve image-based facial recognition comparing a current image against a prior image to determine that a person using the device did not switch. In some implementations, a video is captured comprising a sequence of sequential images (frames) and one or more of the images is selected based on determining that the one or more images have appropriate characteristics for user verification.

A speaker assembly may be configured to identify spatialized sound likely to have come from whomever is currently providing the input, e.g., the person directly in front of the device.

The device may also be configured to receive biometric data such as a fingerprint provided by the whomever provided the input, e.g., recognizing a fingerprint as a user touches a touch interface with a finger.

The method 900 further involves determining whether the first user is using the device during the on-going use of the device based on the user verification, as shown in block 908. This may involve matching the image of the person, the sound of the person, the fingerprint of the person, etc., with previously obtained user information.

The on-going use of the device may be permitted based on the user verification, e.g., based on determining that the first user is currently using the device. In contrast, based on determining that the first user is not using the device during the on-going use of the device various corrective actions may be taken. The corrective actions may include, as examples, providing an alert, message, or call to an authority and/or restricting use of content via the electronic device until an identity of the first user is verified at the first device.

In some implementations, a diligence score is determined based on the captured image or sound recording. For example, this may involve assessing the image, e.g., via a computer vision technique or machine learning process, to assess a state of attention of the user. A credit for a course with the first user may be awarded or withheld based on the diligence score.

In some implementations, the method 900 further uses one or more input-triggered user verifications to determine which of multiple users was most recently using the device prior to (or during) damage occurring to the device. For example, (e.g., images, sound recordings, etc.) and one or more associated verification(s) may be time stamped and used to determine which of multiple inmates was using a device closest in time to damage occurring on the device, e.g., based on comparison with a time stamp associated with the time of damage to the device.

The user verification may involve multiple images captured (e.g., periodically) during the on-going use, e.g., during a test, and the method 900 may involve outputting a sequence of these multiple images, e.g., captured during responses to test questions provided via one or more input devices during the test. Similarly, the on-going use may involve a course and the method 900 may involve providing course completion information that includes: a listing of courses completed, lengths of time to complete the courses, and/or images of the first user and environments around the first user during the courses.

User Verification Password Reset and Image-Selection Based Verification

In some implementations, a password reset process is provided. In one example, a computer system includes a device, software, module, or other function configured to execute instructions stored in memory to reset a user's current password or to create a new password. Resetting a password may be triggered manually, for example when an inmate believes that his or her password has been compromised, or automatically, for example, based on an automatic detection process that monitors for a number of access attempts, a number of simultaneous accesses, an amount of access, access during periods in which an inmate is not available for access (e.g., while an inmate is receiving medical treatment, in a portion of the facility in which access is unavailable, etc.), etc. In some implementations, an inmate may be asked to enter identification information (e.g., inmate ID#, DOB) and then provide an answer for one or more of the security questions. In some implementations, periodic or random checks are provided. For example, once a month when the inmate logs in, at random, the system may ask the inmate to answer one of his or her security questions to ensure it is the correct inmate logging in to the account or device.

Figure 10:
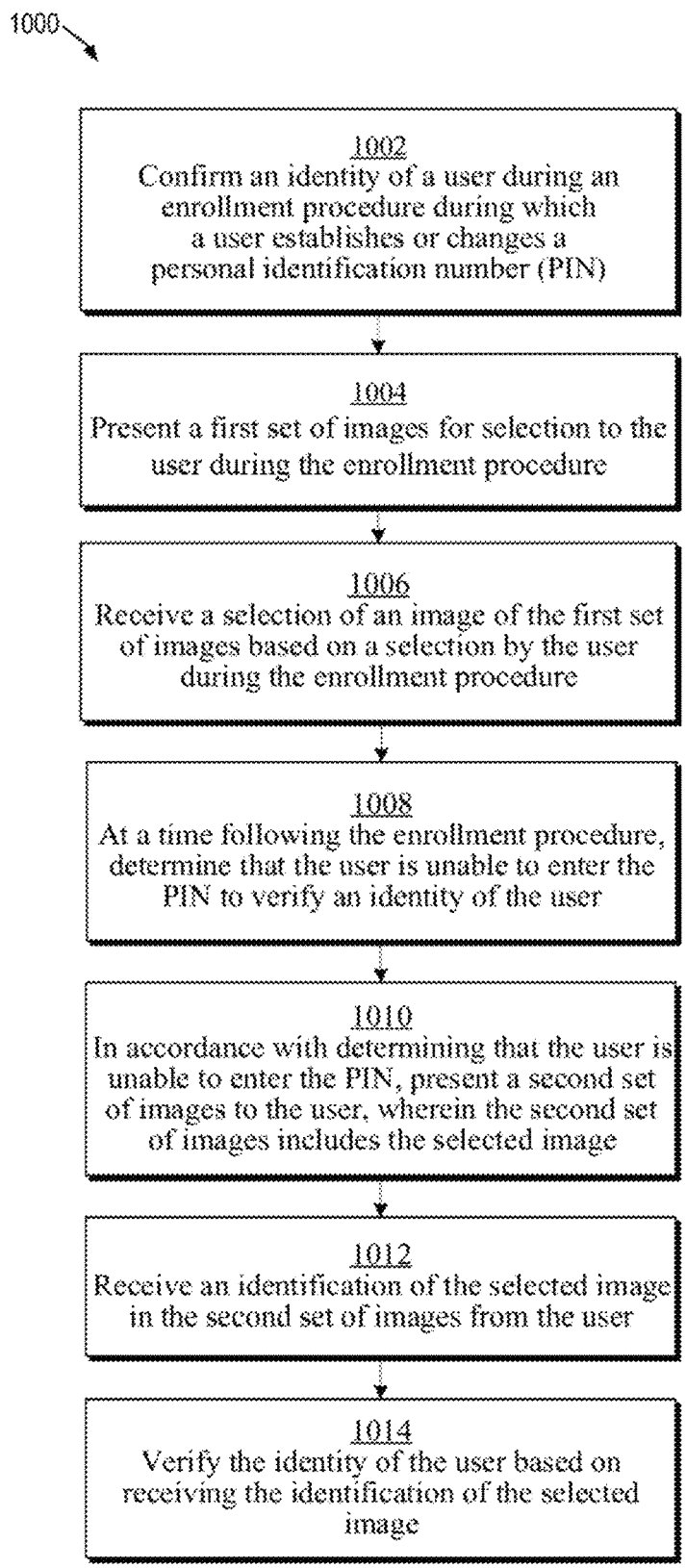
FIG. 10 is a flow chart illustrating an exemplary method for user verification based on a user-identification of a previously selected image.

FIG. 10 is a flow chart illustrating an exemplary method 1000 for user verification based on a user-identification of a previously selected image. The exemplary method 1000 can be implemented via a computing device, for example, by storing and using a processor to execute instructions in a non-transitory computer-readable medium. Reference to the method being performed by a computing device includes the method being performed by one or more computing devices and/or using one or more processors.

The method 1000 involves confirming an identity of a user during an enrollment procedure during which a user establishes or changes a personal identification number (PIN), as shown in block 1002. This may be during the initial enrollment (e.g., when the user is booked into a confinement facility) or a subsequent re-enrollment and may be done manually by a guard or automatically based on supplied identification credentials. The re-enrollment may occur when the user changes a previously established PIN.

The method 1000 involves presenting a first set of images for selection to the user during the enrollment procedure, as shown in block 1004. For example, the first set of images may be displayed in one or more grids, e.g., 10 grids of 10×10 image (1000 images total), of pictures or other images depicting different items (boats, buses, clouds, beaches, etc.) may be presented. The method 100 involves receiving a selection of an image (e.g., a 2D or 3D grid of pixels) of the first set of images based on a selection by the user during the enrollment procedure, as shown in block 1006.

The method 1000, at a time following the enrollment procedure, determines that the user is unable to enter the PIN to verify an identity of the user, as shown in block 1008, for example, based on receiving input identifying that the user has forgotten the PIN.

The method 1000, in accordance with determining that the user is unable to enter the PIN, presents a second set of images to the user, wherein the second set of images includes the selected image, as shown in block 1010. The second set of images may have other images that are the same or different than the other images of the first set of images or may present the same images in a different order, arrangement, or configuration. The method receives an identification of the selected image in the second set of images from the user, as shown in block 1012, and verifies the identity of the user based on receiving the identification of the selected image, as shown in block 1014.

Figure 11:
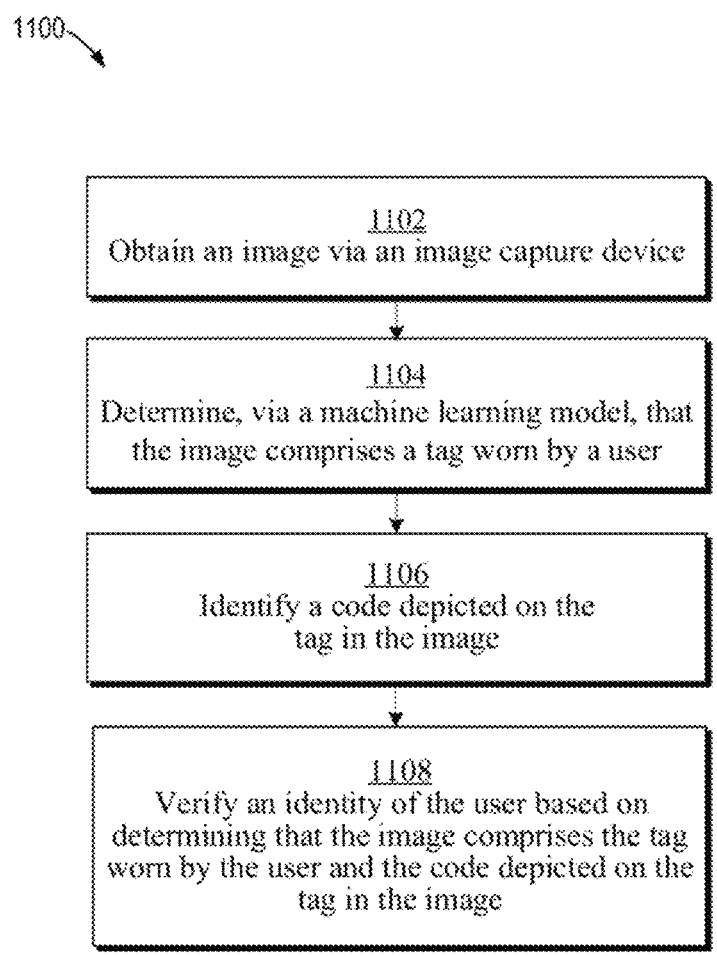
FIG. 11 is a flow chart illustrating an exemplary method for user verification based on a computer-vision identification of a wearable identification tag.

User Verification Based on Computer Vision Identification of a Wearable Identification Tag FIG. 11 is a flow chart illustrating an exemplary method for user verification based on a computer-vision identification of a wearable identification tag. The exemplary method 1100 can be implemented via a computing device, for example, by storing and using a processor to execute instructions in a non-transitory computer-readable medium. Reference to the method being performed by a computing device includes the method being performed by one or more computing devices and/or using one or more processors.

The method 1100 involves obtaining an image via an image capture device, e.g., camera, as shown in block 1102. The image may be obtained following an instruction for the user to position the tag in view of the image capture device during the obtaining of the image. The method 1100 determines, via a machine learning model, that the image comprises a tag worn by a user, as shown in block 1104, and identifies a code depicted on the tag in the image, as shown in block 1106. The identification of the code may also involve use of a machine learning model. The determination that the image comprises a tag worn by a user and identification of the code on the tag may be performed by a single machine learning model or multiple models. The code may be an alphanumeric code, a bar code, a graphical code, or any other visual representation of a unique identifier. The method 1100 verifies an identity of the user based on determining that the image comprises the tag worn by the user and the code depicted on the tag in the image, as shown in block 1108.

Exemplary System

Figure 12:
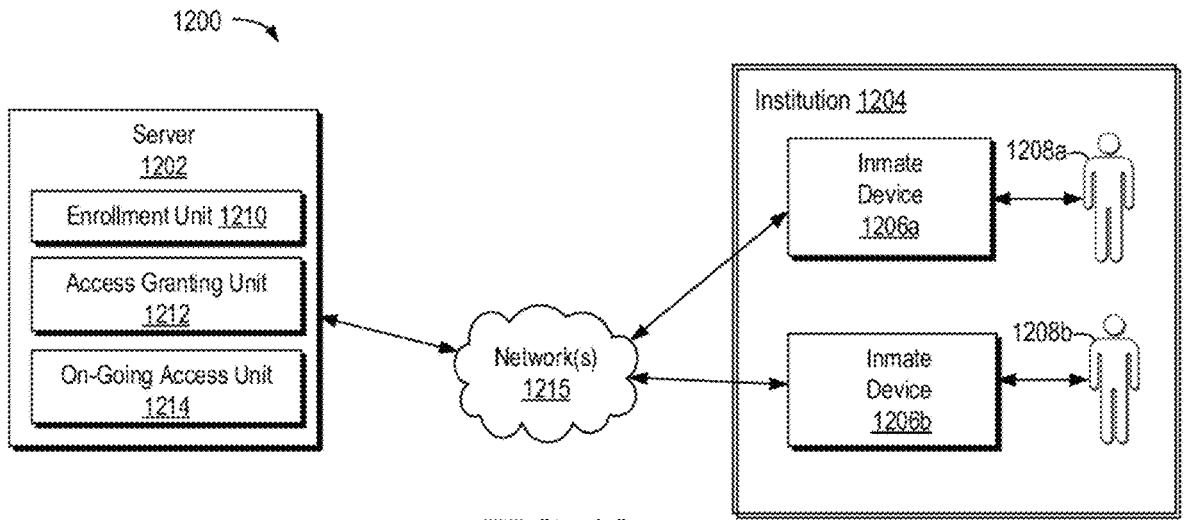
FIG. 12 is a block diagram of a computing environment in which one or more implementations of the invention can be practiced.

FIG. 12 is a diagram of an environment in which one or more implementations of the present disclosure can be practiced. The system configuration of FIG. 12 is provided as one example of a system configuration. In a particular implementation, devices and the communications between them as well as the allocation of functionality amongst the multiple devices involved can be configured differently depending upon the particular circumstances of the implementation.

In FIG. 12, there is a server 1202 and, within an institution 1204, inmate devices 1206a, 1206b used by inmates 1208a, 1208b. These devices 1202 and 1206a-b may be configured to communicate with one another via network 1215. For example, inmate devices 1206a-b can be configured with apps (e.g., a web browser or a specialized app) for communicating with one another and with server 1202. The apps can additionally or alternatively include calling/messaging functionality enabling the inmates to place calls, receive calls, send messages, receive messages, and for other purposes related to communications with and information about the inmates, non-inmates, and the institution 1204. The apps can include software modules that facilitate the monitoring of calls, messages, music, content, and/or the information that is accessed via and/or stored on the inmate devices 1206-b. The apps can include software modules that monitor the devices to ensure that inmates are not able to use the devices and/or communications for prohibited purposes.

The server 1202 may provide or make available education courses, entertainment, and other content. Such content may include, but are not limited to, files having images, videos, text, audio, slides, presentations, other types of electronic content and/or combinations of types of electronic content. Courses may be accessed for viewing/use on the inmate devices 1206a-b. The content can include user interface features specific to particular courses or other content, functions for determining related content, and/or other functions useful in monitoring content provided via the inmate devices 1206a-b. The server 1202 and/or inmate devices 1206a-b may additionally or alternatively enforce configurable parameters, e.g., time limits, engagement tracking, etc. The server 1202 and/or inmate devices 1206a-b request input, e.g., as part of an interactive course or course evaluation. Such content includes examination questions (i.e., text, audio, etc.), question sequencing, etc. The server 1202 and/or inmate devices 1206a-b may include software that automatically generates/selects questions, answer choices, and/or correct answers. The server 1202 and/or inmate devices 1206a-b may include software that determines to and/or facilitates access to content and/or provision of rewards based on responses to requests for input. For example, a reward module may track engagement based on received responses and award credits accordingly that may be used to obtain rewards that are provided on the inmate devices 1206a-b.

The server 1202 includes an enrollment unit 1210, an access granting unit 1212, and an on-going access unit 1214 for performing enrollment and user verification features disclosed herein. The enrollment unit 1210 provides user interface features from obtaining enrollment data from a user. The access granting unit 1212 grants access to a user to a device, system, or services based on user verification. The on-going access unit 1214 permits ongoing access to the device, system, or services based on additional user verification.

Figure 13:
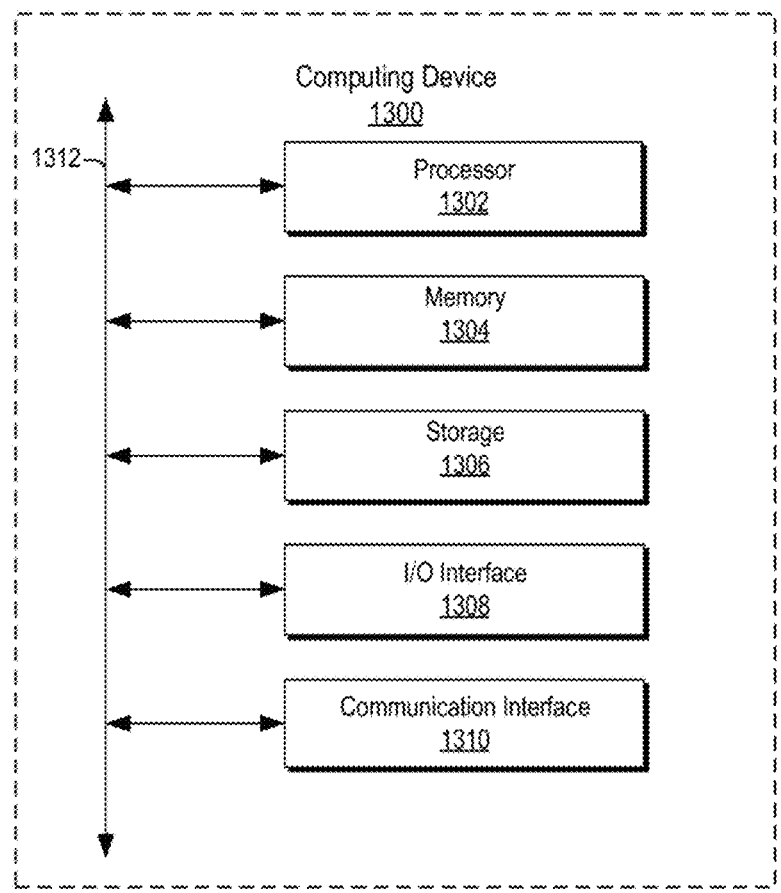
FIG. 13 is a block diagram depicting an example hardware implementation.

FIG. 13 is a block diagram depicting an example hardware implementation for the servers and devices described in FIG. 12. Each such device 1300 may include a processor 1302 that is communicatively coupled to memory 1304 and storage 1306 and that executes computer-executable program code and/or access information stored in the memory 1304 and storage 1306. The processor 1302 may comprise a microprocessor, an application-specific integrated circuit ("ASIC"), a state machine, or other processing device. The processor 1302 can include any of a number of processing devices, including one. Such a processor 1302 can include or may be in communication with a computer-readable medium storing instructions that, when executed by the processor, cause the processor to perform the operations described herein.

The memory 1304 and storage 1306 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 1300 may also comprise a number of external or internal devices such as input or output devices. For example, the device 1300 may have input/output ("I/O") interface 1308 that can receive input from input devices or provide output to output devices. A bus 1312 can also be included in the device 1300. The bus 1312 can communicatively couple one or more components.

The device 1300 can also include at least one network interface device or other communication interface 1310. The communication interface 1300 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Input devices may also include one or more cameras or other sensors that obtain information about the environment around the device. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method comprising:
    at a processor:
        confirming an identity of a user during an enrollment procedure during which a user establishes or changes a personal identification number (PIN), wherein the enrollment procedure occurs when the user is booked into a confinement facility;

presenting a first set of images for selection to the user during the enrollment procedure;

receiving a selection of an image of the first set of images based on a selection by the user during the enrollment procedure; and at a time following the enrollment procedure, determining that the user is unable to enter the PIN to verify an identity of the user;

in accordance with determining that the user is unable to enter the PIN, presenting a second set of images to the user, wherein the second set of images includes the selected image;

receiving an identification of the selected image in the second set of images from the user; and verifying the identity of the user based on receiving the identification of the selected image.

2. The method of claim 1, wherein the enrollment procedure occurs when the user changes a previously-established PIN.

3. The method of claim 1, wherein presenting the first set of images comprises presenting a grid of the images simultaneously.

4. The method of claim 1, wherein presenting the first set of images comprises presenting multiple grids of subsets of the images sequentially.

5. The method of claim 1, wherein the first set of images is the same as the second set of the images.

6. The method of claim 1, wherein determining that the user is unable to enter the PIN to verify the identity of the user comprises receiving input identifying that the user has forgotten the PIN.

* * * * *